United States Patent [19]
Cox

[11] 4,079,303
[45] Mar. 14, 1978

[54] CHARGING SYSTEM AND METHOD FOR MULTICELL STORAGE BATTERIES

[75] Inventor: Jay A. Cox, Rolling Hills Estates, Calif.

[73] Assignee: The United States of America as represented by the United States Department of Energy, Washington, D.C.

[21] Appl. No.: 709,352

[22] Filed: Jul. 28, 1976

[51] Int. Cl.$^2$ ............................................. H02J 7/08
[52] U.S. Cl. ...................................... 320/17; 320/23; 320/39
[58] Field of Search .................. 320/8, 13, 14, 15, 17, 320/18, 20, 21, 23, 24, 39, 40

[56] References Cited
U.S. PATENT DOCUMENTS

| | | | |
|---|---|---|---|
| 3,280,397 | 10/1966 | Bruns | 320/17 X |
| 3,305,754 | 2/1967 | Oaks et al. | 320/18 X |
| 3,454,859 | 7/1969 | Ford et al. | 320/13 X |

Primary Examiner—Robert J. Hickey
Attorney, Agent, or Firm—Dean E. Carlson; Frank H. Jackson; Hugh W. Glenn

[57] ABSTRACT

A battery-charging system includes a first charging circuit connected in series with a plurality of battery cells for controlled current charging. A second charging circuit applies a controlled voltage across each individual cell for equalization of the cells to the fully charged condition. This controlled voltage is determined at a level above the fully charged open-circuit voltage but at a sufficiently low level to prevent corrosion of cell components by electrochemical reaction. In this second circuit for cell equalization, a transformer primary receives closely regulated, square-wave voltage which is coupled to a plurality of equal secondary coil windings. Each secondary winding is connected in parallel to each cell of a series-connected pair of cells through half-wave rectifiers and a shared, intermediate conductor.

16 Claims, 5 Drawing Figures

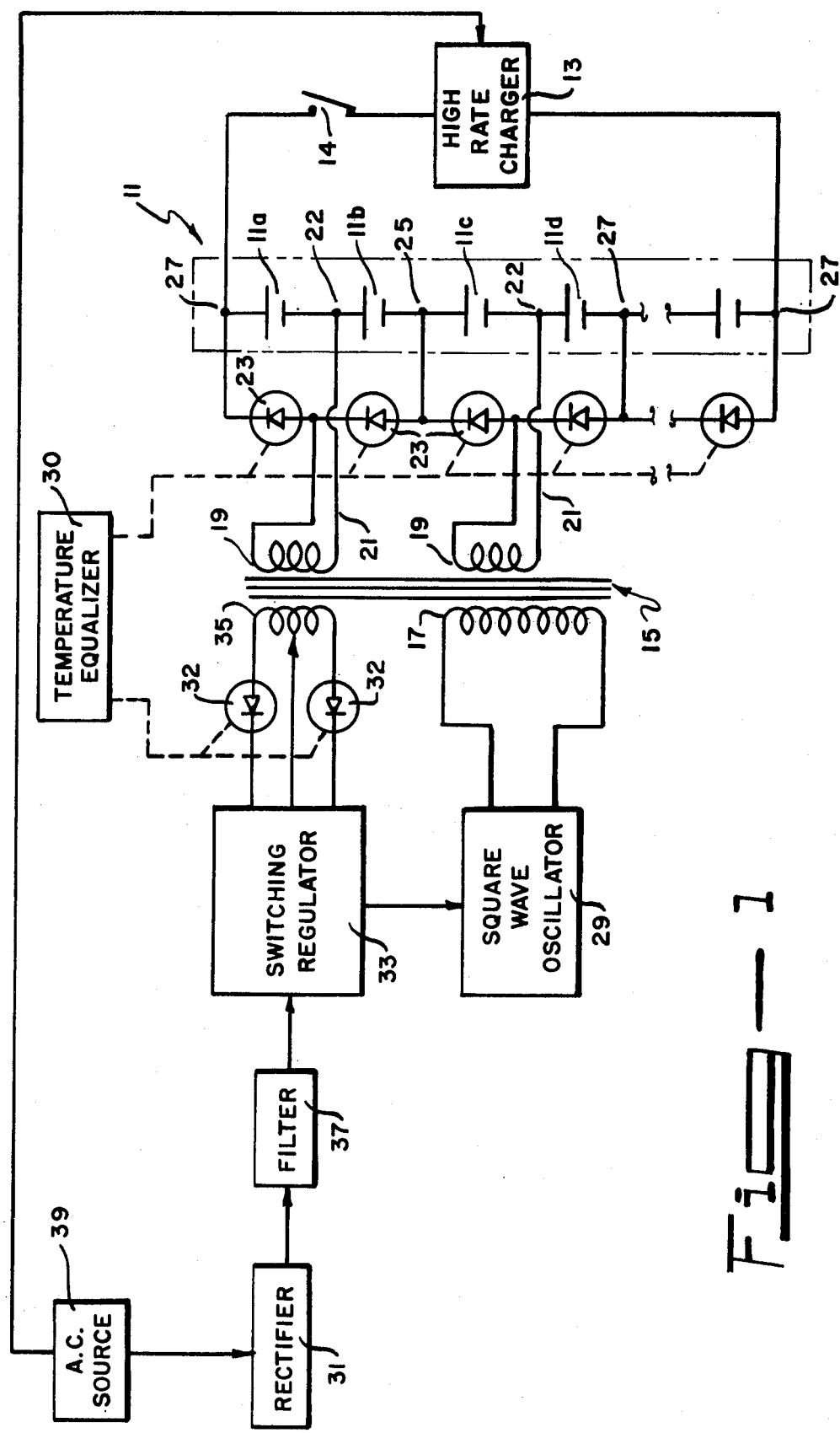
Fig—1

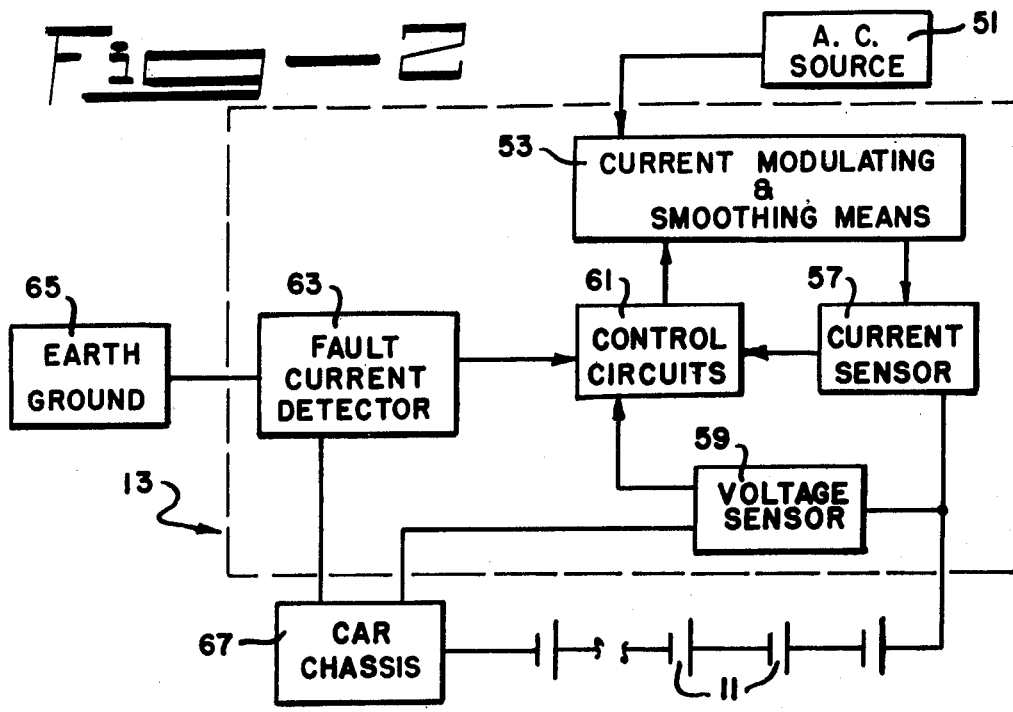
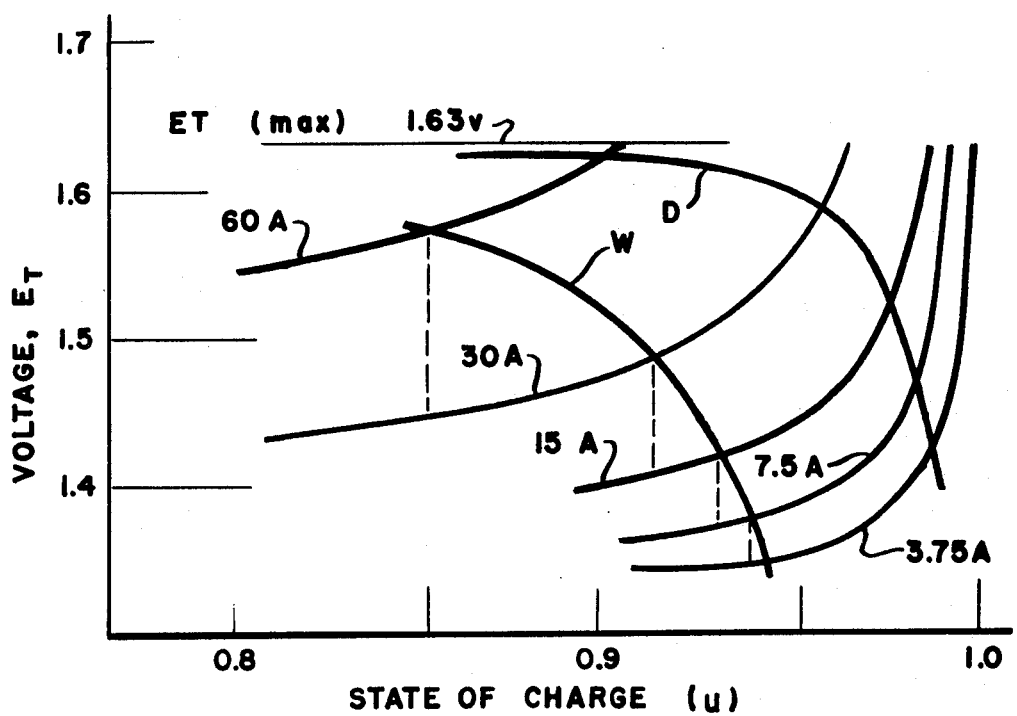

CELL EQUALIZING CHARGER (Half wave)

CHARGING SYSTEM AND METHOD FOR MULTICELL STORAGE BATTERIES

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to circuits for recharging electrochemical cells and is particularly applicable to cells to which damage may result from overcharging. Where a plurality of cells are connected in series, various cells may self-discharge at different rates than others. Consequently, a series-connected charging source of constant current level will apply too high a voltage across those cells that first become fully charged. In some cells, particularly the high-temperature molten salt cells with metal sulfides as positive electrode materials, structural components of the cell may enter into undesired electrochemical and corrosive reactions. In other cells with aqueous electrolyte, water can be lost by electrolysis to $H_2$ and $O_2$.

Various high-temperature electrochemical cells with molten salt electrolyte have been described in U.S. Pat. Nos. 3,887,396 to Walsh et al., entitled "Modular Electrochemical Cell", June 3, 1975; 3,933,520 to Gay and Martino, entitled "Method of Preparing Electrodes with Porous Current Collector Structures and Reactants for Secondary Electrochemical Cells", Jan. 20, 1976; and 3,941,612 to Steunenberg et al., entitled "Improved Cathode Composition for Electrochemical Cell", Mar. 2, 1976. Other cell types are also illustrated in copending patent applications Ser. No. 636,882 by Kaun, entitled "Porous Carbonaceous Electrode Structure and Method for Secondary Electrochemical Cell", filed Dec. 2, 1975, and Ser. No. 642,438 by Roche et al., entitled "Calcium Alloy as Active Material in Secondary Electrochemical Cell", filed Dec. 19, 1975. Each of these patents and patent applications is assigned to the assignee of the present application.

The cells illustrated in these applications employ metal chalcogenides such as iron sulfides, copper sulfides, cobalt sulfides, and nickel sulfides as positive electrode materials opposite to negative electrodes that include as active materials the alkali metals, the alkaline earth metals and alloys of these metals, for example, lithium, lithium-aluminum, lithium-silicon, calcium, calcium-aluminum, calcium-magnesium and calcium-silicon. High-energy cells of these types operate effectively with molten salt electrolytes including compositions of the alkali metal halides and alkaline earth metal halides. Typical electrolytes are LiCl—KCl, LiF—LiCl—KCl and $CaCl_2$—NaCl.

Battery-charging circuits for secondary electrochemical cells of these types require close control of the charging voltage to prevent electrochemical degradation of the structural components within the cell. For example, in a cell using FeS as positive electrode material and iron or iron-base alloys as current collector and other structural components, the upper voltage level that can be applied to an individual cell is about 1.63 volts. The equilibrium voltage, that is, the open-circuit voltage at full charge, for the Li—Al/FeS cell is about 1.33 volts. For the Li—Al/$FeS_2$ cell with molybdenum as a current collector, the upper level is about 2.1 volts with an equilibrium voltage of about 1.77 volts. Charge voltages must be above the equilibrium voltage to obtain full charge. However, charging schemes that impose voltage levels above the upper limit to an individual cell may result in an electrochemical attack by the electrolyte onto the cell's structural components.

Ordinarily batteries of these cells will involve a plurality of series-connected cells in order to obtain desired voltage levels. Recharging merely by imposing a controlled voltage or current through such a series-connected battery will result in excessive voltage on some cells before others are fully charged. Individual cells in a more fully charged state may be subjected to voltage levels that result in electrochemical degradation of cell structural components. Such an imbalance in the state of charge of individual cells can result from variations in self-discharge rates during use.

Battery systems including aqueous electrolyte such as the lead-acid battery have some inherent overcharge protection from electrolysis of water. Although this offers some protection to cell components, cell life may be shortened from loss of electrolyte. In addition, it may be desirable in some applications, such as in large banks of batteries for off-peak power storage, to seal the cells to eliminate the need for water replenishment. Consequently, the improved charging system of the present invention may also have use with batteries having aqueous electrolyte.

Therefore, it is an object of the present invention to provide an improved battery-charging system for use with a series-connected plurality of cells.

It is a further object to provide an uncomplicated system for conveniently recharging a plurality of series-connected cells with periodic equalization of cell charge.

It is also an object to provide an improved method for charging and equalizing a plurality of series-connected electrochemical cells.

SUMMARY OF THE INVENTION

In accordance with the present invention a battery-charging system for use with a plurality of series-connected cells is provided. Each cell within the electrically connected series requires protection from excess voltage at or near the fully charged state. The system includes a first electrical circuit for charging the series-connected cells at a controlled current level. Suitable control means are provided for reducing the current level in stepwise increments until a sufficiently low current is reached to be continued by a second charging circuit. The second charging circuit is capable of applying equal and controlled voltages across each individual cell in the series.

In a specific embodiment of the second charging circuit, a transformer with a primary and a plurality of secondary coil windings is provided. The power secondary windings and a reference secondary winding are closely coupled so as to provide a rectified secondary voltage that closely follows the rectified reference secondary voltage. A sufficient number of secondary windings are included for connection of one winding to each of a pair of series-connected cells. Each of these windings has the same number of turns to provide equal charge voltage to each cell. The windings are connected in parallel to each cell of the pair with a common lead intermediate the two cells of the pair. The opposite terminal of the winding is connected through two half-wave rectifiers to the opposite-polarity terminals of the cell pair.

One other aspect of the present invention is a method of charging a plurality of series-connected cells such that each individual cell is protected from excess voltage at or near full charge. The method involves first passing an initial charging current through the plurality of series-connected cells and then repetitively reducing this charging current until a predetermined current is obtained across the plurality of series-connected cells. Charge equalization is then performed by imposing a controlled voltage across each of the cells within the series.

BRIEF DESCRIPTION OF THE DRAWINGS

The present invention is illustrated in the accompanying drawings wherein:

FIG. 1 is a diagrammatic representation of a battery-charging system.

FIG. 2 is a more detailed representation of a high-rate charger.

FIG. 3 is a graph showing a typical recharge profile of average voltage versus state of charge for the high-rate charger and FeS/LiAl cells.

DETAILED DESCRIPTION OF THE PREFERRED EMBODIMENT

Figure 1A:
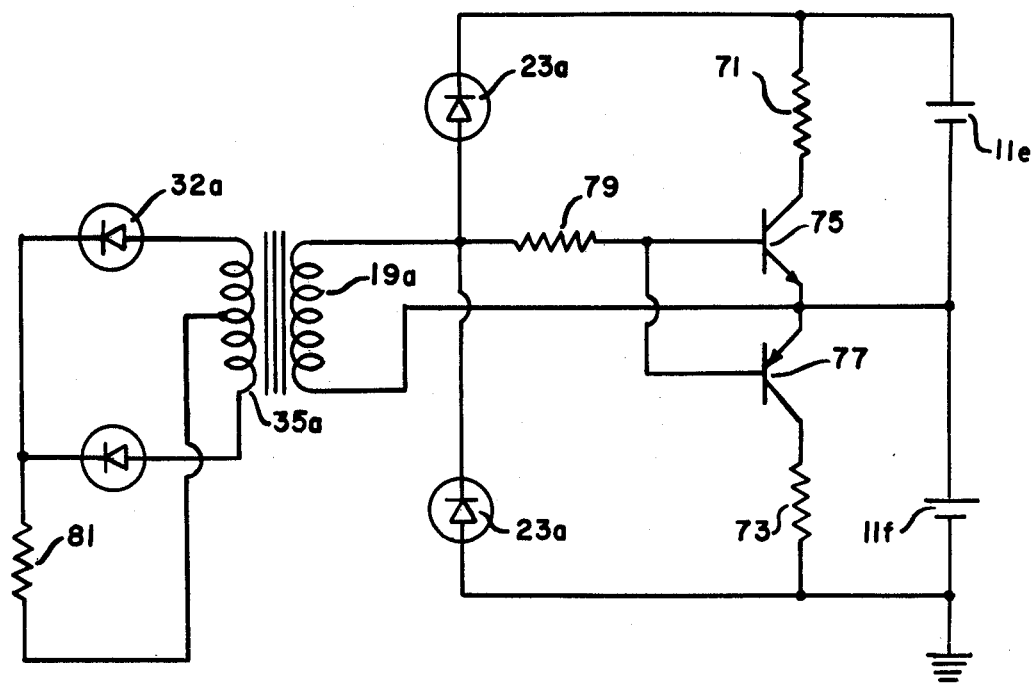
FIG. 1a is a fragmentary schematic showing a modification to the system of FIG. 1.

Referring to FIG. 1, a battery-charging system for recharging a plurality of series-connected cells 11 is illustrated. The system as shown includes a high-rate charger 13 connected through relay switch 14 in series with the cells and a second charging circuit for topping or equalizing the charge to the individual cells. The cell equalization circuit is shown with a transformer 15 having a primary winding 17 and a plurality of secondary windings 19 and 35. Sufficient secondary windings are provided to couple one to each pair of cells illustrated as 11a with 11b and 11c with 11d. Winding 35 provides a reference feedback voltage for regulation purposes closely equal to the open-circuit, rectified output voltage of a secondary winding 19.

Each of the secondary windings 19 is connected to a pair of series-connected cells to be charged by means of a common lead 21 to a terminal 22 intermediate the two cells of a pair and by two half-wave rectifiers 23 shown as diodes arranged in bifurcation from the opposite extremity of the secondary windings. The two half-wave rectifiers 23 associated with each cell pair are oppositely aligned and connected to terminals 25 and 27 at opposite poles across the cell pair. The alignment of the half-wave rectifiers in respect to the battery cell pair, allows each cell of the pair to be alternately charged and rested during alternate half-cycles of current from the transformer.

Transformer primary 17 is driven by square-wave oscillator 29 and rectifier 31. The primary voltage is controlled by the switching regulator 33 and reference feedback winding 35. This type regulator along with a suitable filter 37 removes even harmonic frequency and other powerline perturbations that may occur.

By use of the square-wave oscillator 29 with a controlled voltage input, a controlled value of driving voltage can be provided during each current pulse. This is of importance since the voltage coupled through the secondary windings 19 to the individual cells must be below a limited value to prevent electrochemical degradation of the cell components. The voltage outputs of each of the secondary windings 19 are made as near equal as possible by providing an equal number of turns in each. close transformer coupling, that is minimized magnetic path between secondaries, provides low output impedance and close following of the secondary to the feedback secondary voltage. These close controls are intended to minimize some of the inconsistency in the secondary voltage outputs. An additional major source of inequality of output voltages is nonuniformity of rectifier voltage drop. This source is minimized by matching rectifier votl-amp characteristics and utilizing temperature equalizing, rectifier mounts.

Ordinarily the electrochemical cells that employ molten salt electrolytes are maintained at elevated temperatures, e.g. 375° to 600° C. These cells are therefore contained within an insulated housing. In order to protect the electrical components such as half-wave rectifiers 23, they are located outside the housing at ambient temperature. For consistent operation, temperature equalizer means as represented at 30 is provided to maintain diodes 23 and similar diodes 32 in the feedback circuit at about the same temperature, e.g. to within about 5° C. The temperature equalizer means 30 can be such as a common mounting plate of metal or other thermally conductive material to act as a constant temperature, heat sink for each diode.

It is important to the battery design that leads such as common lead 21 and leads from terminals 25 and 27 of the electrochemical cells be sufficiently small, e.g. 14 gage, to prevent excessive loss of heat.

The various components shown in FIG. 1 including half-wave rectifiers 23, transformer 15, oscillator 29, rectifier 31, filter 37 and switching regulator 33 are all available from commercial sources and can be suitably designed by those skilled in the art. Each is appropriately sized depending on the particular electrical load of the design. Various other components can also be employed within the scope of the present invention. For instance, the half-wave rectifiers 23 can be diodes as shown or suitable transistors operated as synchronous rectifiers, that is transistors synchronously switched between the saturated and the cutoff mode.

Transformer 15 and switching regulator 33 are appropriately designed and sized to give closely equal and constant open-circuit outputs in secondary coils 19.

In a practical implementation it is necessary to utilize some means of loading across individual battery cells with compensating loading on the rectified output of the feedback secondary to assure that the open circuit output voltage does not rise above that at full load by an excessive amount. In some embodiments adequate loading to reduce the amount of change in output voltage may be obtained by relying on the battery cell, minimum self-discharge current. If this is not known or it is too widely different among cells, the implementation illustrated in FIG. 1a can be employed.

In FIG. 1a transformer secondary 19a is coupled through diodes 23a to cells 11e and 11f. Resistors 71 and 73 are connected across each cell in series with transistors 75 and 77 to provide loading only during charge. Resistor 79 is selected such that transistors 75 and 77 conduct only when transformer secondary 19a is providing power for battery charge. If continual loading is permissible, the transistors and resistor 79 can be omitted and the resistors 71 and 73 directly connected across each of the cells. One other resistor 81 is illustrated in the circuit coupling the feeback secondary winding 35a and diodes 32a to the control circuitry. Resistor 81 is included to compensate for the effect of the loading current in the feedback circuit.

The open circuit voltage to the cells is regulated to be no more than the charge volt limit for the cell being charged. To accomplish such regulation, switching regulator 33 can be one of a variety of available implementations of the basic transistor switching type. Choice of mode of operation is not critical to the considerations involved in the present invention.

Square-wave oscillator 29 is one which will operate at a sufficiently high frequency, e.g. 400 Hertz, to allow use of small oscillator components at low cost. Frequencies much above that value will require more expensive and less available half-wave rectifiers at 23.

The equalizing portion of the battery-charging system as illustrated in FIG. 1 can conveniently be carried by the vehicle. This permits the connection of the equalizing circuit to an ordinary a-c source 39 for recharge whenever necessary without the unreliability of a multiconductor electrical connector.

Turning now to FIG. 2 where the high-rate charging circuit is shown in more detail. Although any suitable charge voltage can be provided with transformer coupling, a sufficient number of cells 11 can be connected in series for charging so that a convenient line voltage can be employed. For instance, a 220 volt a-c source at 51 can be used to charge a battery of approximately 165 volts maximum terminal voltage.

Current modulating and smoothing means 53 comprises known components for rectifying, controlling and filtering the a-c current input. Merely by way of example, a silicon-controlled rectifier with suitable diode and filter arrangement can be employed for means 53.

Means 53 provides a filtered, rectified output to allow fast charging rates with a maximum current of roughly three times that otherwise available to a given battery of series-connected cells. This is due to the elimination of very short high-voltage peaks that may cause electrochemical degradation of structural cell components.

Current and voltage sensors 57 and 59 provide the suitable input to control circuit 61 to permit the desired current control by the current modulating and smoothing means 53.

For safety, a fault current detector 63 is shown connected to both earth ground 65 and the car chassis 67. Detector 63 instantaneously opens a control circuit within 61 or other suitable relay to disconnect a-c source 51 should a flow of current be detected to earth ground. This arrangement will protect an operator who touches the vehicle while standing on the ground.

In operating the battery-charging system described above, the high-rate charger is initially interconnected through switch 14 in series with the plurality of series-connected cells 11 and a constant-current charge is maintained through the cells. The cell equalization system coupled in parallel to the cells through transformer 15 can either be in operation during this period or be disabled through suitable relays within the a-c power line. While the high-rate charger is in operation, the cell equalization charger can contribute only a negligible amount of recharge due to its low current capacity.

The initial charge rate of the high-rate charger is established at a sufficiently high level to charge the battery within a reasonable time without exceeding the current or voltage limits of any cell. For example, typical charge rates are about a 5 or 10 hour rate, that is the current needed ideally to supply a full charge to a completely discharged cell within that time. Charging at the initial rate is continued until a predetermined cutoff voltage is obtained across the plurality of cells in series. This cutoff voltage can be estimated by making reasonable assumptions as to the extreme conditions that may exist.

In the most extreme case, one cell is assumed to have a low self-discharge rate and the remaining (N−1 cells) are assumed to have high self-discharge rates. The difference in these self-discharge rates over the period between equalizations, e.g. one week, will be assumed to produce a cumulative state of charge difference of about 5%. During charging the gradual and constantly increasing state of charge of all of the cells is accompanied by an increase in voltage. The one unique cell remains at a higher terminal voltage due to the higher state of its initial charge. For purposes of explanation, the relationship of state of charge u to terminal voltage $E_T$ during charging of any cell is assumed given by the following equation which is a variation of that given by Sheppard, U.S. Naval Research Laboratory, J. of the Electrochemical Society, July 1965, pages 657–664.

$$E_T = E_{oc} + i(R + K/1-u) \quad \text{Eq. 1}$$

where
- $E_T$ is terminal voltage
- $E_{oc}$ is open circuit voltage
- $R$ is equivalent cell resistance
- $K$ is an empirically determined constant
- $u$ is state of charge given as a fraction of full charge capacity.

FIG. 3 illustrates equation 1 as predicted for an FeS/LiAl cell with currents of 60 A, 30 A, 15 A, 7.5 A and 3.75 A. For a 300 A-Hr cell these five curves correspond to 5, 10, 20, 40 and 80 hour charge rates. For this system $E_{oc}$ is 1.33 v and $E_{T\text{-}max}$ is 1.63 v. At above 1.63 v, $FeS_2$ is formed electrochemically, resulting in corrosion of iron components within the cell structure. Values of R and K for this cell were calculated to be approximately 0.002 ohm and 0.000278.

The one unique cell can be charged to a state ($u_A$) corresponding to the limiting voltage ($E_{T\text{-}max} = 1.63$ for FeS/LiAl) and the particular charge rate ($i$). These values of $u_A$ are determined by the intersection of the equation 1 curves with $E_{T\text{-}max}$. In order to protect this one unique cell, the high rate charger must have a cutoff voltage across the entire plurality of series-connected cells lower than that of any other combination of cells. This terminal voltage is approximately:

$$N(E_{oc} + i(K/1-(u_A-\Delta u))) \text{ for } N >> 1 \quad \text{Eq. 2}$$

where
- N is the number of cells in series.
- $u_A$ is the state of charge of the one unique cell.
- $\Delta u$ is the difference between the charge of the one unique cell and the remainder of the cells.

Curves W and D in FIG. 3 correspond to weekly and daily equalizations with $\Delta u$ of 0.048 and 0.008 respectively within equation 2. The intersection of curves W or D with each of the current curves corresponds to the maximum safe cutoff voltage, expressed as average cell voltage, across the entire plurality of series-connected cells at the stated current.

In using the high rate charger on a plurality of FeS/LiAl cells in series, charging may proceed at the 5 hour rate (60 A for 300 A-Hr cell) until an average cell voltage of 1.57 is attained across the battery terminals. The charge rate is then reduced along the dashed line corresponding to $u = 0.85$, for example to the 10 hour rate. Charging continues at 30 A until an average voltage cutoff of about 1.49 is reached and a second reduction to the 20 hour rate (15 A) is illustrated. This repetitive charging to a predetermined average cutoff voltage followed by reduction in charging current is continued until a sufficiently low current is attained to be carried by the cell equalization circuit. At this point the high rate charger is terminated and the cell equalization circuit completes the charging operation. For the battery of series-connected 300 A-Hr FeS/LiAl cells illustrated by FIG. 3, five current reduction steps, each one-half of the preceding current, will reach a 160 hour charge rate of 1.875 A which is about an appropriate level for the cell equalization circuit.

In the other extreme case, that is, where one cell is of high self-discharge rate and $N-1$ cells are of low self-discharge rate, the above maximum cutoff voltages must also be employed. This is because in a system feasible for mass production, one is not aware of the particular self-discharge rates and hence state of charge distribution throughout a given battery of cells and therefore the worst case must be assumed. In the more favorable case, $N-1$ cells can only be charged to the $u_A - \Delta u$ state, while the unique cell with lower initial charge can only be charged to the $u_A - 2\Delta u$ state.

The cell equalization system is appropriately employed to bring each of the cells to the fully charged state after the high rate charger has been terminated. In its operation, an equal square wave voltage is made available for each pair of cells from each of the plurality of secondary transformer windings 19. During one-half cycle of alternating square-wave current, charge is applied to one of the two cells of a pair through one of the two half-wave rectifiers or diodes 23. The circuit is completed through common lead 21 connected intermediate the pair of cells. During the following half-cycle, the remaining diodes conduct to charge the remaining cell of each pair of cells, again with current passing through the common lead 21. This system has a number of advantages such as the use of only one transformer wiring for each pair of cells and the use of only one half-wave rectifier or diode for each individual cell. The system further minimizes the number of leads that must be passed from the high-temperature battery case to the battery-charging components maintained at a lower temperature. This reduces heat loss from the molten salt electrolyte.

Other important features in the operation of this cell equalization system are that by applying electrical charge current in square-wave form the maximum charge can be obtained in a given period of time. This is done without exceeding voltage limits that would otherwise cause corrosion of the individual cell components and without incurring penalties due to interactions of adjacent cell-charging currents. Also, a single voltage regulator on the transformer primary input negates the need for voltage regulation from each of the transformer secondary windings having an equal number of turns. Voltage perturbations that may occur within an alternating current line source are removed in a smoothing or filtering circuit to permit the use of maximum voltage without incursions into voltage levels that might produce corrosion within the cell.

Figure 4:
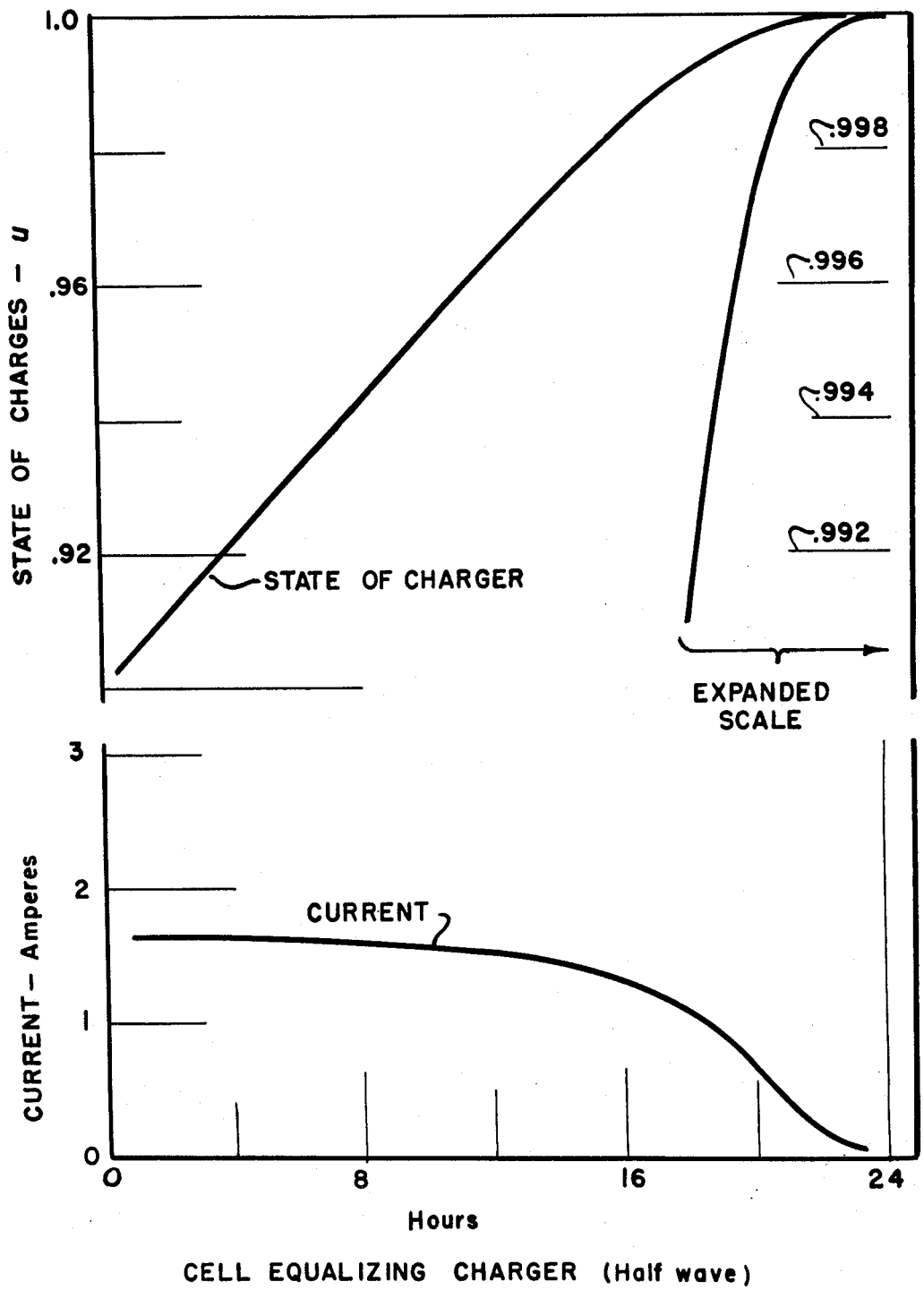
FIG. 4 is a graph of time versus current and state of charge using an equalization circuit with an FeS/LiAl battery of cells for the cell having the highest self-discharge rate.

FIG. 4 illustrates the operation of the cell equalization circuit for a battery of 300 A-Hr FeS/LiAl cells. Each of the cells within the battery are connected in half-wave parallel to one of the secondary coils 19 of transformer 15 as shown in FIG. 1. The voltage at each of the rectifier outputs is regulated such that their open circuit or zero output current value is no more than the limiting voltage at which undesirable electrochemical reactions occur, e.g. no more than about 1.6 volts for the FeS/LiAl cell. As a result of resistance within the leads, e.g. about 0.05 ohm for 2 M of 14 gauge wire, the voltage imposed on the cell will be somewhat less than this maximum value until the charge current approaches zero at near full charge. It is seen from FIG. 4 that the charge current remains fairly constant until $u$ reaches about 0.98 and then drops off, permitting those cells at lower charge state to catch up and equalize with the cells at the higher state of charge. Therefore, equalization occurs only when all of the cells approach the fully charged state.

It is therefore seen that the present invention provides a battery-charging system that is uncomplicated and can be used to charge such as a vehicle battery at high-charge rates over several cycles and then periodically equalize the charge within the individual battery cells. The system minimizes heat loss from the high-temperature battery as well as minimizing the imposition of excessive charge voltages to individual cells that might result in corrosion of cell components. The improved method of charging an electrochemical battery permits a high-rate charger to be used to obtain a maximum charge rate without exceeding limiting voltages. The method further permits cell charge equalization at convenient, e.g. weekly, intervals.

The embodiments of the invention in which an exclusive property or privilege is claimed are defined as follows:

1. A battery charging system for use with a plurality of series connected cells, each of which having terminals of opposite polarity, wherein each cell requires protection from excessive voltage at and near the fully charged state, said system comprising:
   a first electrical means for charging said plurality of series connected cells at an initial charge rate;
   control means for repetitively reducing said initial charge rate and for terminating the charging with said first electrical means; and
   a second electrical means for charging each of said plurality of series connected cells with controlled and equal voltage.

2. The system of claim 1 wherein said second electrical means comprising a transformer having a primary and a plurality of secondary windings, sufficient secondary windings being provided to connect one winding to each pair of series-connected electrochemical cells, said one winding being connected in parallel with each cell of said pair via a common lead to a terminal connected intermediate said series-connected pair, and via two half-wave rectifiers, each coupled to one of opposite-polarity terminals across said pair of cells, whereby each of said cells within said pair being separately and intermittently charged during alternate half-cycles of imposed current by time-sharing of said common lead.

3. The system of claim 2 wherein said transformer having a reference secondary winding interconnected with regulator and oscillator means for controlling said transformer primary, each of said secondary windings connected to each pair of cells having an equal number of turns and being closely coupled to said reference secondary winding.

4. The system of claim 3 wherein said regulator and oscillator means including a controlled source of square-wave voltage coupled to said transformer primary.

5. The system of claim 2 wherein said half-wave rectifiers are diodes and temperature-control means are provided for maintaining each of said diodes to within about 5° C. temperature range.

6. The system of claim 1 wherein said control means terminates charging with said first electrical means when said charge rate is reduced to a level approximating the current resulting from said second electrical means.

7. The system of claim 1 wherein said first electrical means comprises current modulating and smoothing means for rectifying, controlling and filtering charging current and sensor means for determining current and voltage to said plurality of series-connected cells and for adjusting said current modulating and smoothing means to control said current and voltage.

8. The system of claim 1 wherein said control means repetitively reduces said first charge rate by a factor of about 2 at each reduction until a predetermined current level is reached and said first electrical means is terminated.

9. The system of claim 8 wherein said second electrical means imposes an equal open-circuit voltage on each of said series-connected cells at a level such that the resulting current being about equal to said predetermined current at which said first electrical means is terminated.

10. A method of charging a plurality of series-connected electrochemical cells wherein each cell requires protection from excess voltage at and near its full charge, said method comprising:

passing an initial controlled current through said plurality of series-connected cells;
repetitively reducing said controlled current until a predetermined current level through said plurality of cells is reached and then discontinuing said controlled current;
imposing charge from a source of controlled and equal, open-circuit voltage across each of said plurality of series-connected cells until a nearly equal state of charge is established in each cell.

11. The method of claim 10 wherein said controlled current is reduced when the voltage needed across said plurality of series-connected cells to produce said current exceeds a value that would impose a voltage across the cell having the lowest self-discharge rate in said series that exceeds a limiting voltage at which corrosive electrochemical reaction with cell structure occurs.

12. The method of claim 11 wherein said controlled current is reduced by a factor of about 2 for about 5 times before said predetermined current is obtained and controlled current charging is discontinued.

13. The method of claim 10 wherein said controlled and equal voltage is above the open-circuit voltage of a fully charged cell but below that voltage which will initiate electrolytic reaction with structural cell components.

14. The method of claim 10 wherein each of said series-connected cells includes a lithium-aluminum alloy negative electrode, a FeS positive electrode and a molten salt electrolyte in contact with iron and structural components, said controlled and equal voltage being about 1.6 volts at zero current imposed on each of said cells at the fully charged state.

15. The method of claim 14 wherein said control voltage is imposed for a period of less than about 20 hours to substantially equalize the state of charge in each of said series-connected cells.

16. The method of claim 10 wherein each of said series-connected cells is alternately charged and alternately rested during alternate half-cycles of said controlled and equal voltage.

* * * * *